United States Patent
Becker et al.

(10) Patent No.: US 7,409,002 B2
(45) Date of Patent: Aug. 5, 2008

(54) SIGNAL MODULATION

(75) Inventors: Matthew E. Becker, Harvard, MA (US); Karl Wyatt, Cary, IL (US)

(73) Assignee: Intel Corporation, Santa Clara, CA (US)

( * ) Notice: Subject to any disclaimer, the term of this patent is extended or adjusted under 35 U.S.C. 154(b) by 1093 days.

(21) Appl. No.: 10/676,565

(22) Filed: Sep. 30, 2003

(65) Prior Publication Data

US 2005/0068885 A1    Mar. 31, 2005

(51) Int. Cl.
*H03C 5/00* (2006.01)
(52) U.S. Cl. ............... 375/269; 375/302; 375/239; 375/289
(58) Field of Classification Search .......... 375/259, 375/295, 293, 239, 346; 327/50
See application file for complete search history.

(56) References Cited

U.S. PATENT DOCUMENTS

| | | | |
|---|---|---|---|
| 5,825,825 A * | 10/1998 | Altmann et al. ............. 375/293 |
| 6,157,330 A | 12/2000 | Bruekers et al. |
| 6,507,299 B1 | 1/2003 | Nuijten |
| 6,574,349 B1 | 6/2003 | Linnartz et al. |
| 6,850,567 B1 | 2/2005 | Frimout et al. |
| 7,149,256 B2 * | 12/2006 | Vrazel et al. .............. 375/295 |
| 2002/0064245 A1 * | 5/2002 | McCorkle ................ 375/346 |
| 2002/0083359 A1 * | 6/2002 | Dow ..................... 713/500 |
| 2003/0142741 A1 * | 7/2003 | Hartmann ................ 375/239 |
| 2003/0152154 A1 * | 8/2003 | Johnson .................. 375/259 |
| 2005/0220213 A1 * | 10/2005 | Tate ..................... 375/295 |
| 2006/0093029 A1 * | 5/2006 | Becker et al. ............. 375/239 |

* cited by examiner

*Primary Examiner*—Chieh M. Fan
*Assistant Examiner*—Sudhanshu C Pathak
(74) *Attorney, Agent, or Firm*—Blakely, Sokoloff, Taylor & Zafman LLP

(57) ABSTRACT

According to an embodiment of the invention, a method and apparatus for signal modulation are described. According to an embodiment of the invention, a method comprises producing and transferring a modulated signal. The modulation of the signal is over a plurality of amplitude levels, including at least a first amplitude level, a second amplitude level and a third amplitude level, and over a plurality of time slots, including at least a first time slot, a second time slot, and a third time slot. The modulated signal transitions from the first amplitude level to the second amplitude level in the first phase slot, remains at the second amplitude level in the second time slot, and transitions from the second amplitude level to the third amplitude level in a third time slot.

25 Claims, 10 Drawing Sheets

49 + 16 = 65 states
(6 bits)

SIGNAL MODULATION

FIELD

An embodiment of the invention relates to signaling in general, and more specifically to signal modulation.

BACKGROUND

In signal operations, numerous different modulation methods may be implemented. In certain cases, a modulation scheme may provide modulation in which a change of a signal in a first modulation mode does not affect or does not greatly affect the signal in a second modulation mode. Such a signal may be described as being orthogonal. For example, a signal may be modulated such that both the phase and amplitude of the signal are modulated, the signal amplitude being a first modulation mode and the signal phase being a second modulation mode.

However, conventional modulation of signals does not utilize all possible signal combinations. For example, the symbols utilized in modulation of a signal in amplitude and phase generally is limited to a single amplitude transition. For this reason, the amount of information that may be contained in such a modulated signal is limited.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
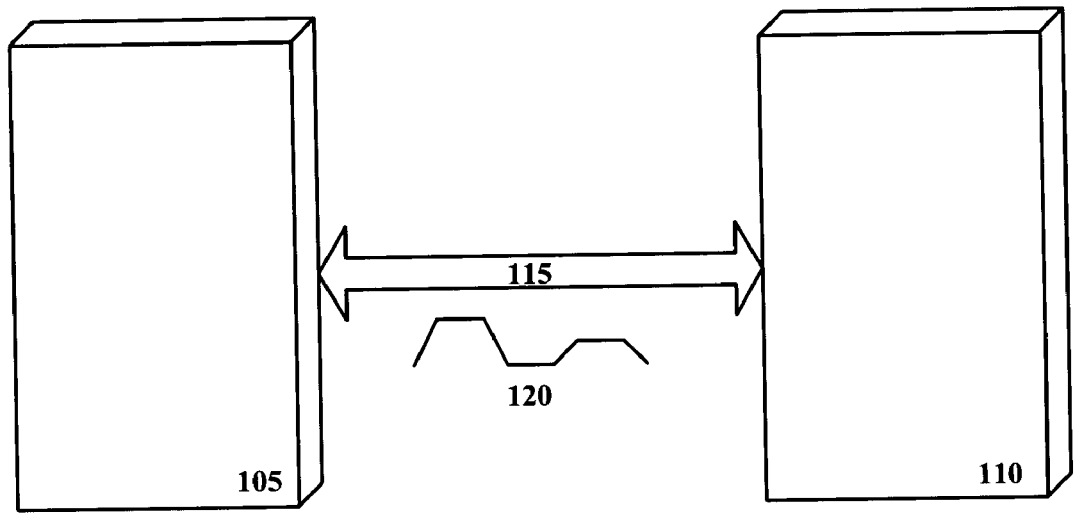
FIG. 1 illustrates an embodiment of signal transmission or transfer between a first agent and a second agent.

A method and apparatus are described for orthogonal signal modulation.

Before describing an exemplary environment in which various embodiments of the present invention may be implemented, some terms that will be used throughout this application will briefly be defined:

As used herein, "orthogonal" describes a signal is modulated in a multiple modes and the modulation modes are largely mutually independent. The term indicates that a change in a first modulation mode has no effect or a limited effect on a second modulation mode. Among others examples, the term includes the modulation of a signal in amplitude and phase.

As used herein, "modulation" means a process by which an information signal is used to modify a characteristic of another signal. Stated in an alternative manner, modulation is a process by which signal characteristics are transformed to represent information or data.

According to an embodiment of the invention, symbols that may be utilized in a modulation scheme are expanded to include additional usable symbols. Under a particular embodiment of the invention, the modulation of a signal includes modulation in a staircase manner.

According to an embodiment of the invention, usable symbols included in the spectrum of states provided by orthogonal modulation schemes are expanded. For example, a particular modulation scheme may include a plurality of differentiable voltage states and a plurality of differentiable phase states or time slots. A conventional modulation scheme will utilize only a limited number of such states. In the general case, in which there are x states in one modulation dimension and y states in another modulation dimension, the number of possible states is equal to $x^y-1$ possible states. In the particular example of 3 differentiable voltage states and 4 differentiable phase states, the total number of available differentiable states is $(3^4-1)$ or 80 possible states. Under an embodiment of the invention, additional states are used in a modulation scheme to carry extra information. The additional states may be limited to states that do not create circuit or channel difficulties.

If a modulation scheme is orthogonal, a bit of modulation may be added in a first dimension without directly impacting a second dimension. A bit may be encoded as a pair of differentiable states, and thus adding a bit to a modulation system therefore doubles the number of required differentiable states. For example 1 bit requires 2 states, 2 bits require 4 states, and continuing in this manner. As additional bits are added, the number of differentiable states grows exponentially. Using orthogonal modulation may lessen the effect of the exponential increase by encoding bits along multiple exponentials without proceeding too far with each exponential. For example, 1 bit of amplitude modulation requires 2 differentiable voltage states (plus an initial third state to provide a voltage transition).

It is possible to add another bit to a modulation scheme by doubling the number of differentiable voltage states. However, this result may also be obtained by retaining the same number of voltage states but adding a bit of phase modulation. The advantage of the latter process is that the resulting system will not require a more sensitive voltage receiver and will not need to operate with a lower signal to noise ratio that would result from the smaller transitions between amplitude states. For simplicity the examples shown in this application show orthogonal modulation that utilizes only signal amplitude and signal phase, but embodiments of the invention are not limited this particular implementation.

FIG. 1 illustrates an embodiment of a system in which modulated signals are transmitted or transferred between two agents. In this system, a first agent 105 and a second agent 110 transfer signals. The agents may be any devices or components that transmit and receive signals. According to one embodiment, the signals are transmitted over a communication channel 115. According to another embodiment, the signals are transferred via a bus. The channel may use any medium, and the channel may be unidirectional or bi-directional. The transmitted signals 120 are modulated using some scheme to encode the signals. The modulation scheme for the signals 120 may include orthogonal modulation, such as modulation of a signal in amplitude and phase.

Figure 2:
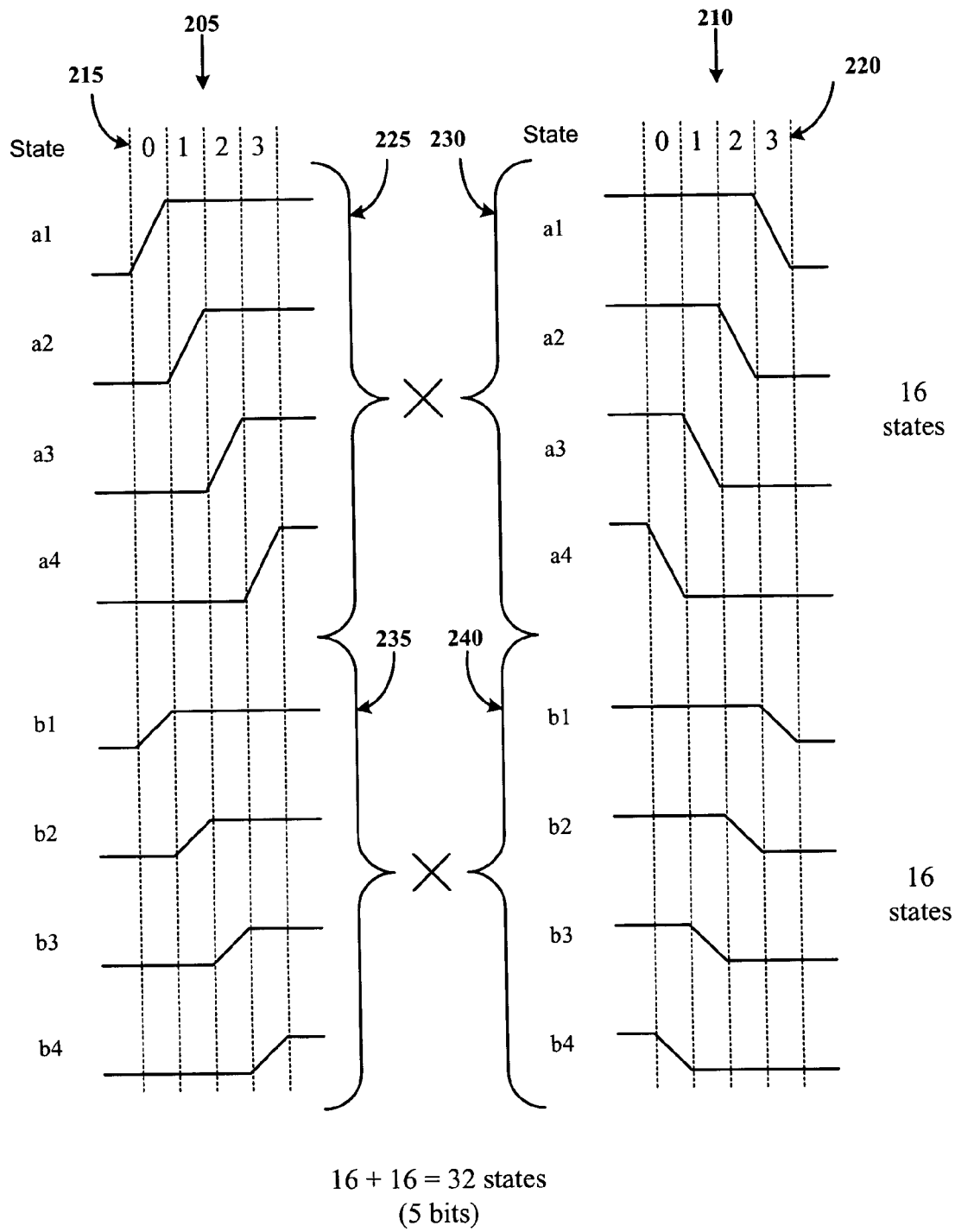
FIG. 2 is an illustration of certain symbols for a modulation scheme.

FIG. 2 is an illustration of certain symbols for a modulation scheme. In this scheme, an orthogonal signal is encoded by a transition between different amplitudes. In addition, the signal is encoded by transition in one of a plurality of different phases. Further, the same encoding is provided for a leading edge of a signal and a trailing edge of the signal, thereby multiplying the number of possible signals.

In FIG. 2, the leading edge modulation 205 and trailing edge modulation 210 are shown. In the leading edge modulation 205, there is either a transition to a first amplitude 235 (shown as a "half amplitude") or a transition to a second amplitude 225 (shown as a "full amplitude"). In this example, the second amplitude 235 is twice the amplitude of the first amplitude 225, but any number of differentiable amplitude and any numerical relationship between the amplitudes may be present in an embodiment of the invention. The leading edge modulation 205 includes four possible phase positions 215, indicated as phase position 0, phase position 1, phase position 2, and phase position 3. While the illustration includes four phase positions, an embodiment of the invention may include any number of phase positions.

In this example, the trailing edge modulation 210 includes transition from a first amplitude 240 and transition from a second amplitude 230. Further, the trailing edge modulation provides for transition in one of four different phase positions 220, phase position 0, phase position 1, phase position 2, and phase position 3. In this particular example, the amplitude levels of the leading edge modulation 205 are required to match the amplitude levels of the trailing edge modulation 220. Although the leading edge phase positions 215 for the leading edge modulation 205 match the phase positions 220 of the trailing edge modulation 210, this is not required for every embodiment of the invention.

FIG. 2 thus demonstrates 1 bit of amplitude modulation on the leading edge, 2 bits of phase modulation on the leading edge, and 2 bits of phase modulation on the trailing edge. In this example the trailing edge always returns to the initial amplitude (such as zero) and thus carries no additional information. While this is one example, an embodiment of the invention may include any number of differentiable amplitudes and phase positions. Matching the four possible transitions for the first amplitude level 235 for the leading edge modulation 205 with the four possible transitions for the first amplitude level 240 for the trailing edge modulation 210 provides sixteen possible states. Matching the four possible transitions for the second amplitude level 225 for the leading edge modulation 205 with the four possible transitions for the second amplitude level 230 for the trailing edge modulation 210 provides sixteen additional states. The total number of states thus is 32, providing sufficient differentiable states to encode five bits of information ($2^5=32$).

Figure 3:
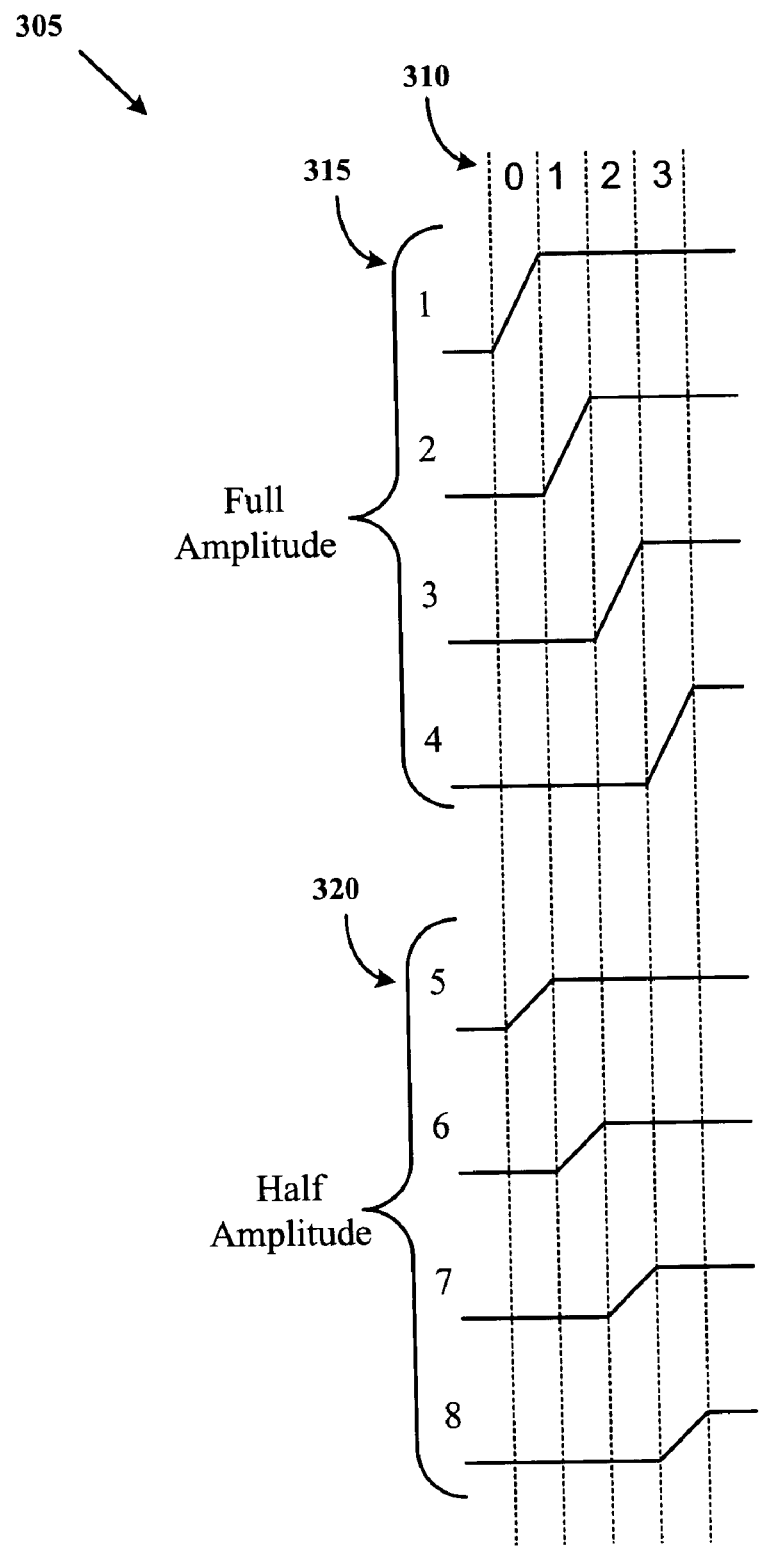
FIG. 3 illustrates certain symbols that may be generated in an embodiment of a modulation scheme.
Figure 4:
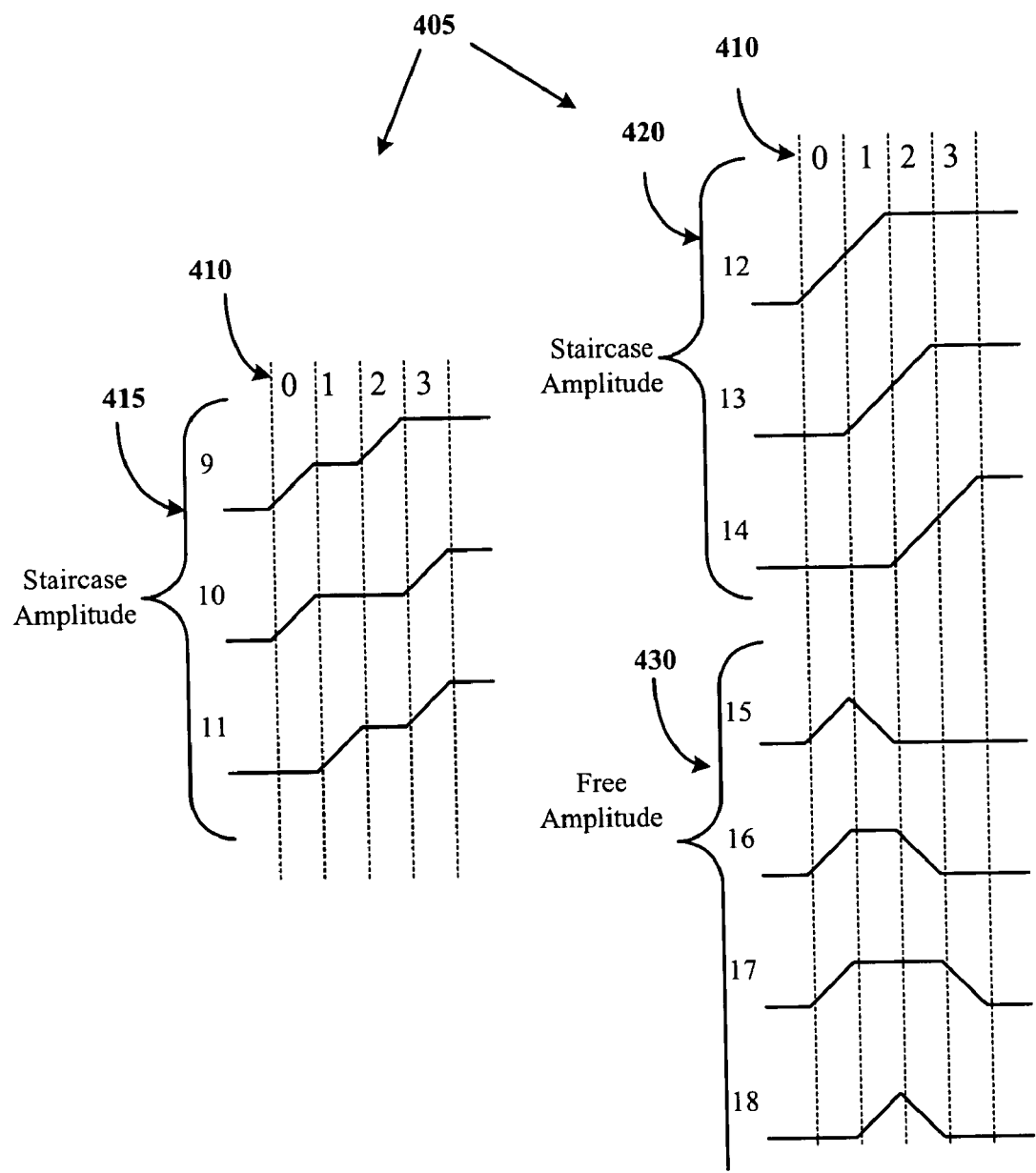
FIG. 4 illustrates additional symbols that may be generated in an embodiment of a modulation scheme.

However, the states shown in FIG. 2 do not include all possible states for the chosen modulation scheme. Additional states may also be shown. For example, FIG. 3 contains the same transitions shown in FIG. 2, with the symbols 305 including transition to a first amplitude level 320 (shown as a "half amplitude") and transitions to a second amplitude level 310 (shown as a "full amplitude"), and four possible phase positions 310. While the symbols shown in the embodiments of FIG. 3 and FIG. 4 illustrate leading edge modulation, trailing edge modulation may be formed in the same manner. In FIG. 3, there are four combinations that transition to the first amplitude level 320 and four combinations that transition to the second amplitude level 315. In each symbol shown in FIG. 3 there is a single transition to an amplitude level, with the transition occurring in one phase period.

However, FIG. 4 illustrates additional symbols that may be generated in an embodiment of a modulation scheme. For the illustrated symbols 405, there are again four possible phase positions 410. In a first set of modulation states, a staircase modulation 415 is provided in which a transition is made from the initial amplitude level to the first amplitude level in a first phase and a transition from the first amplitude level to the second amplitude level in another phase, with at least one intervening phase between the transitions in which the amplitude is unchanged. For example, symbol 9 provides for a transition from the initial amplitude to the first amplitude level in phase position 0, maintenance of the first amplitude level in phase position 1, a transition from the first amplitude level to the second amplitude level in phase position 2, and maintenance of the second amplitude level in phase position 3. Symbol 10 for provides for a transition from the initial amplitude to the first amplitude level in phase position 0, maintenance of the first amplitude level in phase positions 1 and 2, and a transition from the first amplitude level to the second amplitude level in phase position 3. Symbol 11 provides for maintenance of the initial amplitude level in phase position 0, a transition from the initial amplitude to the first amplitude level in phase position 1, maintenance of the first amplitude level in phase position 2, and a transition from the first amplitude level to the second amplitude level in phase position 3.

A second set of possible symbols utilizing staircase modulation 420 is also possible in an embodiment of the invention. However, such symbols do not provide an intervening period in which the amplitude is unchanged. As shown in FIG. 4, symbol 12 provides for a transition from the initial amplitude to the first amplitude level in phase position 0 and a transition from the first amplitude level to the second amplitude level in phase position 1. Similarly, symbol 13 provides for a transition from the initial amplitude to the first amplitude level in phase position 1 and a transition from the first amplitude level to the second amplitude level in phase position 2, and symbol 14 provides for a transition from the initial amplitude to the first amplitude level in phase position 2 and a transition from the first amplitude level to the second amplitude level in phase position 3.

There are additional signal possibilities 430 under embodiments that do not follow the same modulation patterns as the prior examples. For example, symbol 15 provides for a transition from the initial amplitude to the first amplitude level in phase position 0 and a transition back from the first amplitude level to the initial amplitude level in phase position 1. Symbol 16 provides for a transition from the initial amplitude to the first amplitude level in phase position 0, maintenance of the first amplitude in phase position 1, and a transition back from the first amplitude level to the initial amplitude level in phase position 2. Symbols 17 and 18 provide additional examples, and there are other possibilities that may be provided.

Generally, if the circuitry to differentiate 3 voltage levels (1 bit or 2 states) and the circuitry to differentiate 4 phase slots has been constructed, then the circuitry required to differentiate 2 voltage levels in each of the 4 phase slots is largely in place. Therefore, it is possible that any of the states shown in FIGS. 3 and 4 may be differentiated by a receiver with the same or similar circuitry and tolerances as used to receive the states illustrated in FIG. 2.

However, not all waveforms have the same frequency content. The modulation of the states shown in FIG. 2 may be accomplished in the low frequency, pass band of a channel. The phase slots for a channel may be much narrower than the minimum pulse width for the channel. If a signal transitions from a reference voltage level to a new voltage level and then back to the reference level in the time domain of a phase slot, information is encoded at a much higher frequency than the pulse width base band. This is true of waveforms such as symbols 15-18 of FIG. 4. However, if decomposed, the frequency content of symbols 9-11 and 12-14 of FIG. 4, representing staircase modulation, is relatively low. The transitions for such symbols are monotonic (always increasing or decreasing) and thus the waveform is similar to a slowly rising transition. The frequency content of a symbol may be estimated to relative to 0.2/T rise, with the symbols 9-11 and 12-14 of FIG. 4 having relatively long rise times.

Another issue regards inter-symbol interference (ISI). Not all signals have the same immunity to inter-symbol interference (ISI). Symbols 1-4 and 5-7 of FIG. 3 have only a single transition followed by a relatively long pulse width. This length of time allows ringing caused by the first transition to die down before another transition occurs or is expected. In contrast, symbols 12-14 of FIG. 4 have a first transition followed immediately by a second transition. This also true of symbol 15 and 18. The closely spaced transitions may introduce inter-symbol interference from the first transition onto the second transition. However, symbols 9-11 of FIG. 4 have at least one phase slot between transitions, which may lessen the level of ISI.

Figure 5:
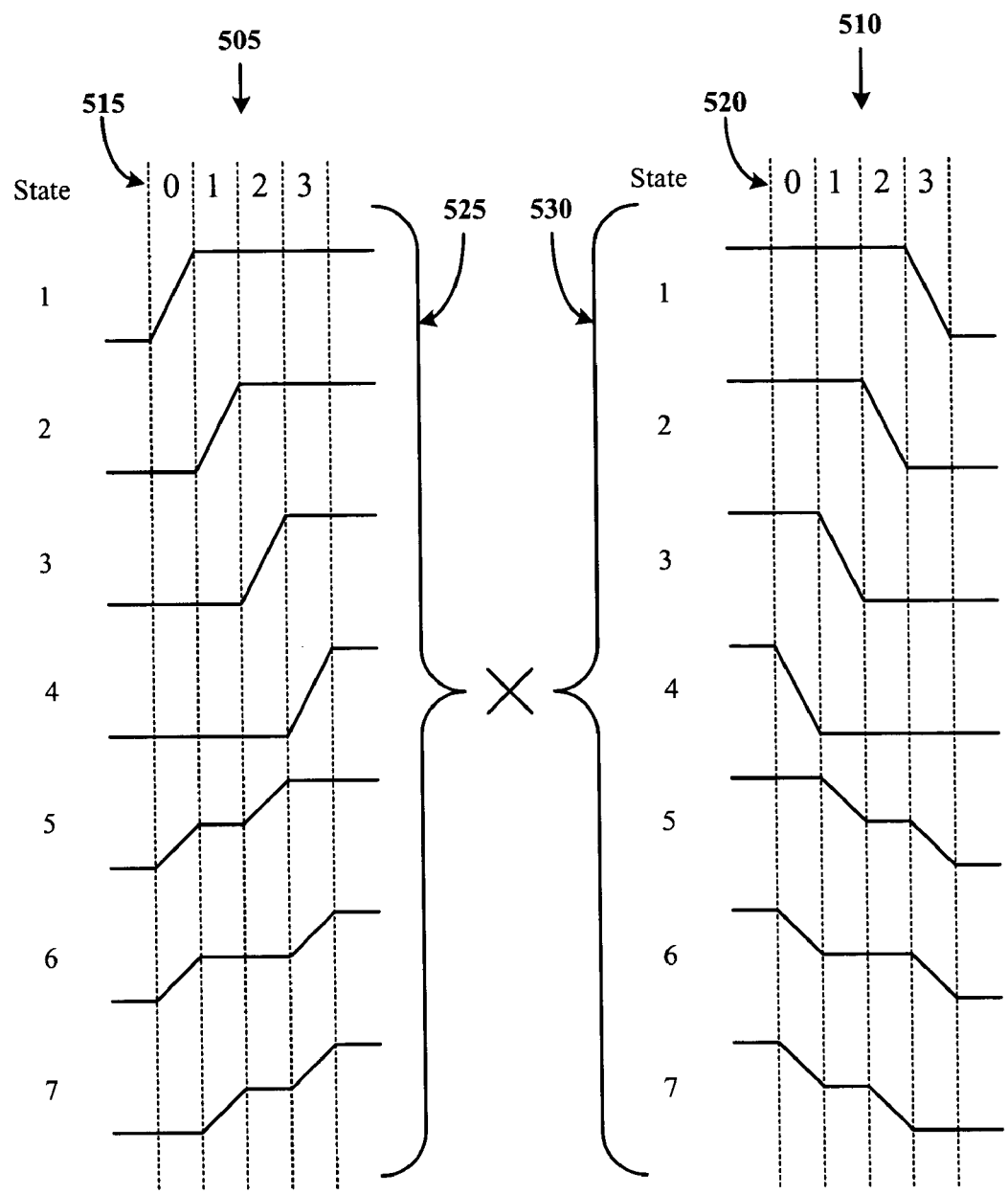
FIG. 5 illustrates certain symbols for an embodiment of a modulation scheme that includes staircase modulation.
Figure 6:
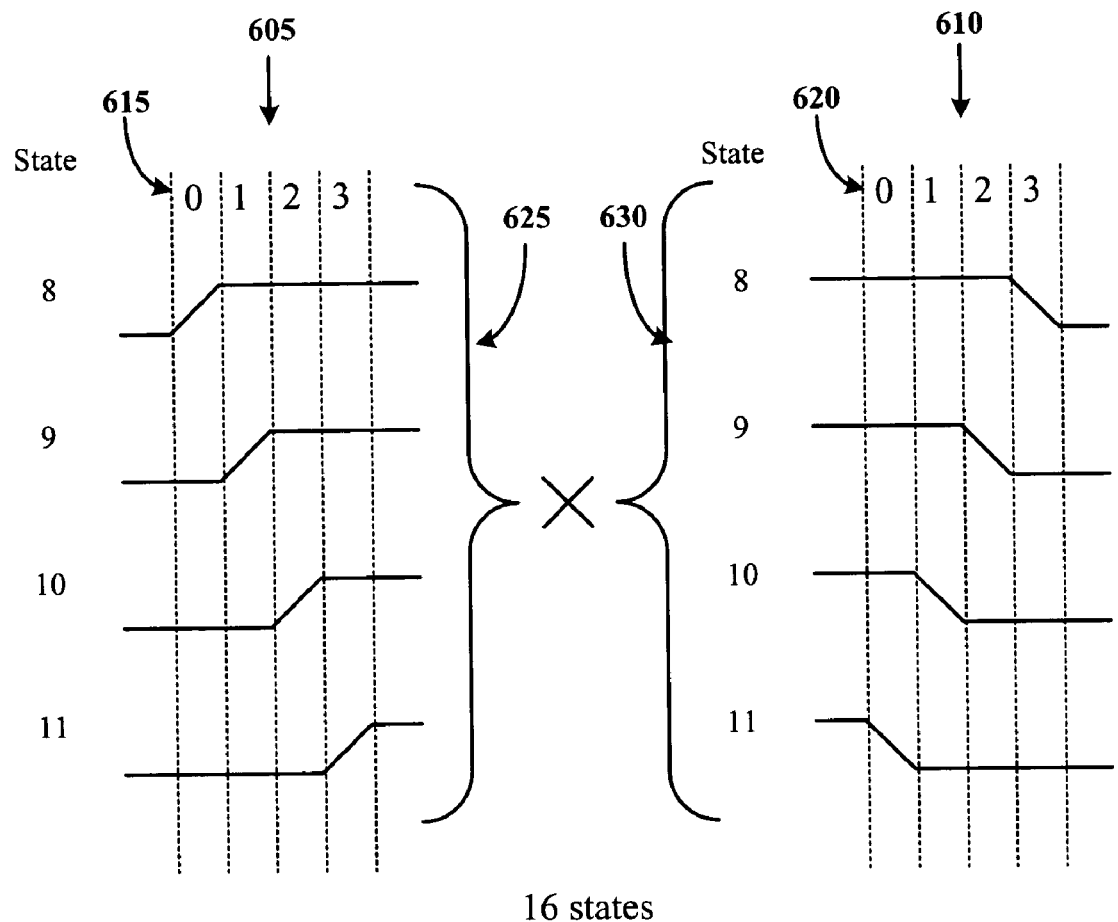
FIG. 6 illustrates additional symbols for an embodiment of a modulation scheme that includes staircase modulation.

FIGS. 5 and 6 illustrate signal modulation according to an embodiment of the invention that includes the use of staircase modulation, such as the staircase modulation 415 illustrated in FIG. 4. The modulation scheme provides for 11 different symbols for the leading edge and 11 different symbols for the trailing edge. In this example, modulation of the leading edge 505 and the trailing edge 510 are shown. The example provides for four possible phase positions for the leading edge 515 and four possible phase positions for the trailing edge 520, although it is not necessary for the leading edge phase positions and the trailing edge phase positions to be equal in number in all embodiments of the invention. There are two signal amplitudes (plus a third initial signal amplitude), with the first, smaller signal amplitude shown in FIG. 6 and the second, larger signal amplitude shown in FIG. 5. In this illustration, the first amplitude provides a half amplitude signal and the second amplitude provides a full amplitude signal. In FIG. 5, symbols reaching the second amplitude for the leading edge 525 and symbols beginning at the second amplitude for the trailing edge 530 are illustrated. Leading edge symbols 1 through 4 illustrate signals that transition from the initial amplitude to the second amplitude in a single phase period, while trailing edge symbols 1 through 4 illustrate signals that transition from the second amplitude to the initial amplitude in a single phase period. Leading edge symbols 5 through 7 illustrate staircase modulated signals in which a signal transitions from the initial amplitude to the first amplitude in a first phase period, maintains the first amplitude for one or more phase periods, including a second phase period, and transitions from the first amplitude to the second amplitude in a third phase period. Trailing edge symbols 5 through 7 illustrate counterpart signals for transitions from the second amplitude to the first amplitude and to the initial amplitude. Because of each of the leading edge symbols 505 concludes at the second amplitude and each of the trailing edge symbols 510 commences at the second amplitude, any of the leading edge symbols shown in FIG. 5 may be matched with any the trailing edge symbols in this figure. Such combinations provide 7×7=49 modulation states.

In addition, FIG. 6 illustrates additional states possible for the embodiment. Symbols are illustrated for leading edge 605 and trailing edge 610. There are four possible phase positions for the leading edge 615 and the trailing edge 620. The illustrated leading edge symbols conclude at a first amplitude 625 and the trailing edge symbols commence at the first amplitude 630. Any of the illustrated leading edge symbols, symbols 8 through 11, thus may be matched with any of the illustrated trailing edge symbols, signals 8 through 11. The number of modulation states shown in FIG. 6 thus is 4×4=16. The total number of modulation states for the modulation scheme provided in the illustrated embodiment of the invention thus is 49+16=65 states. The total number of states is sufficient to encode 6 bits of information, which requires 64 states ($2^6$=64). Therefore, by including the staircase modulation symbols, the modulation scheme may be used to encode an additional bit of information, 6 bits as opposed to 5 bits.

The modulation scheme illustrated in FIGS. 5 and 6 may provide a higher bandwidth for a given set of jitter and voltage tolerances, as compared to conventional modulation techniques. Such higher bandwidth may be provided without requiring significant additional effort for signal differentiation. Further, the increase in bandwidth may provide higher system performance in many different environments.

Figure 7:
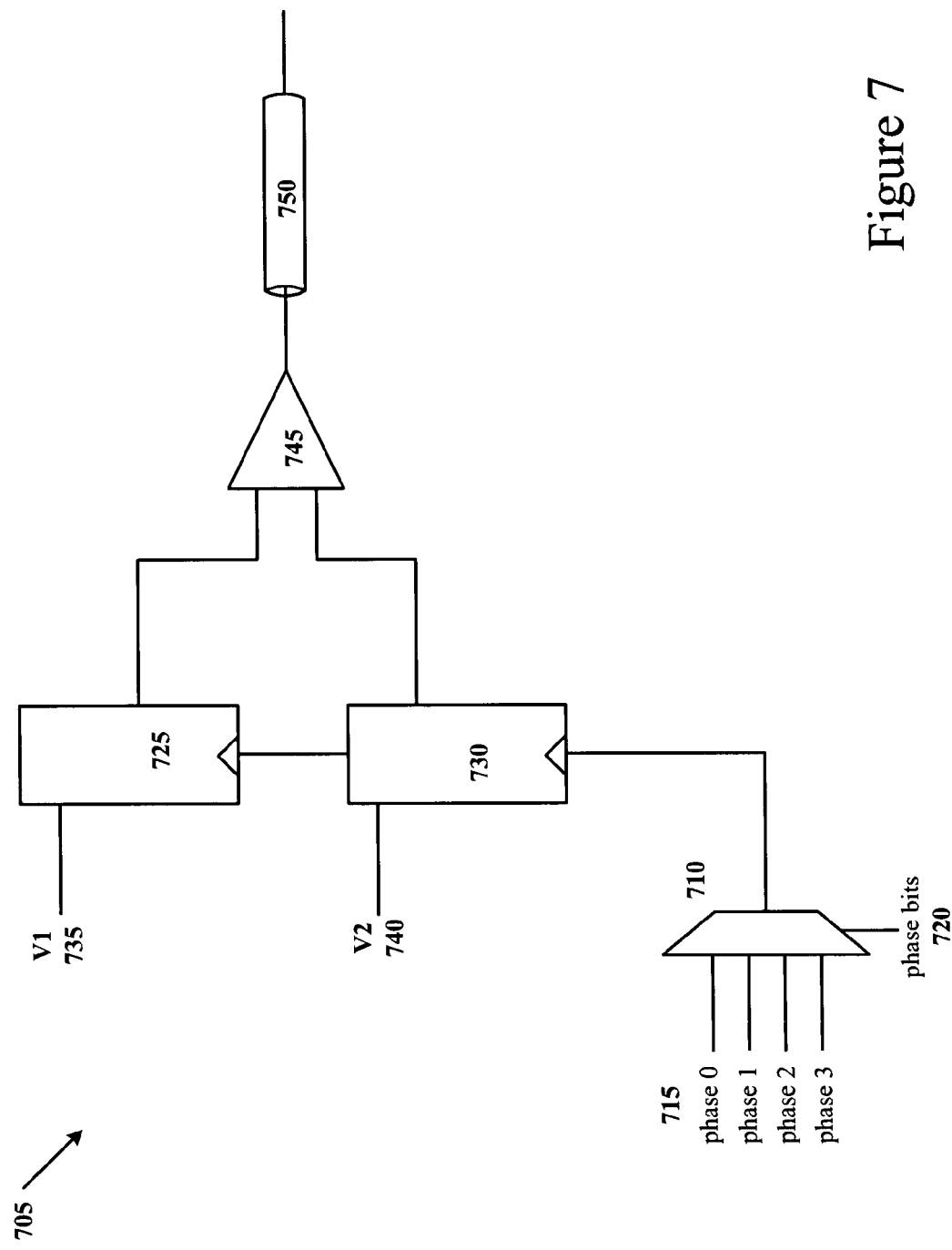
FIG. 7 is a diagram illustrating an embodiment of signal generation.

FIG. 7 is a diagram illustrating an embodiment of a signal modulation operation. As illustrated in FIG. 7, a signal is modulated with two voltage levels (plus a third initial voltage level) and four phase positions. In this example, the system 705 chooses a phase for the signal modulation. The block diagram shows a multiplexer 710, although this physical device and the other physical devices shown in FIG. 7 may not be used in an embodiment of the invention. The multiplexer 710 receives a phase selection signal 720, which would comprise 2 bits for the four phase positions. A signal for the chosen phase signal is then provided to a clock input of a first logic device 725 and a second logic device 730. When the devices are clocked the signal representing the phase, either a signal for a first amplitude, shown as V1 735, or a signal for a second amplitude, shown as V2 740, is directed to a signal generator 745 that generates a signal with the chosen modulation. The modulated signal then is transferred over a communication channel 750 to another component or device. The modulation of the trailing edge may be encoded similarly, with the phase choice signal 720 then representing the phase position to provide a transition to the initial signal amplitude. The illustrated embodiment provides for only a single transition to either a first signal amplitude or a second signal amplitude, and thus is not sufficient for a modulation scheme that includes staircase modulation.

Figure 8:
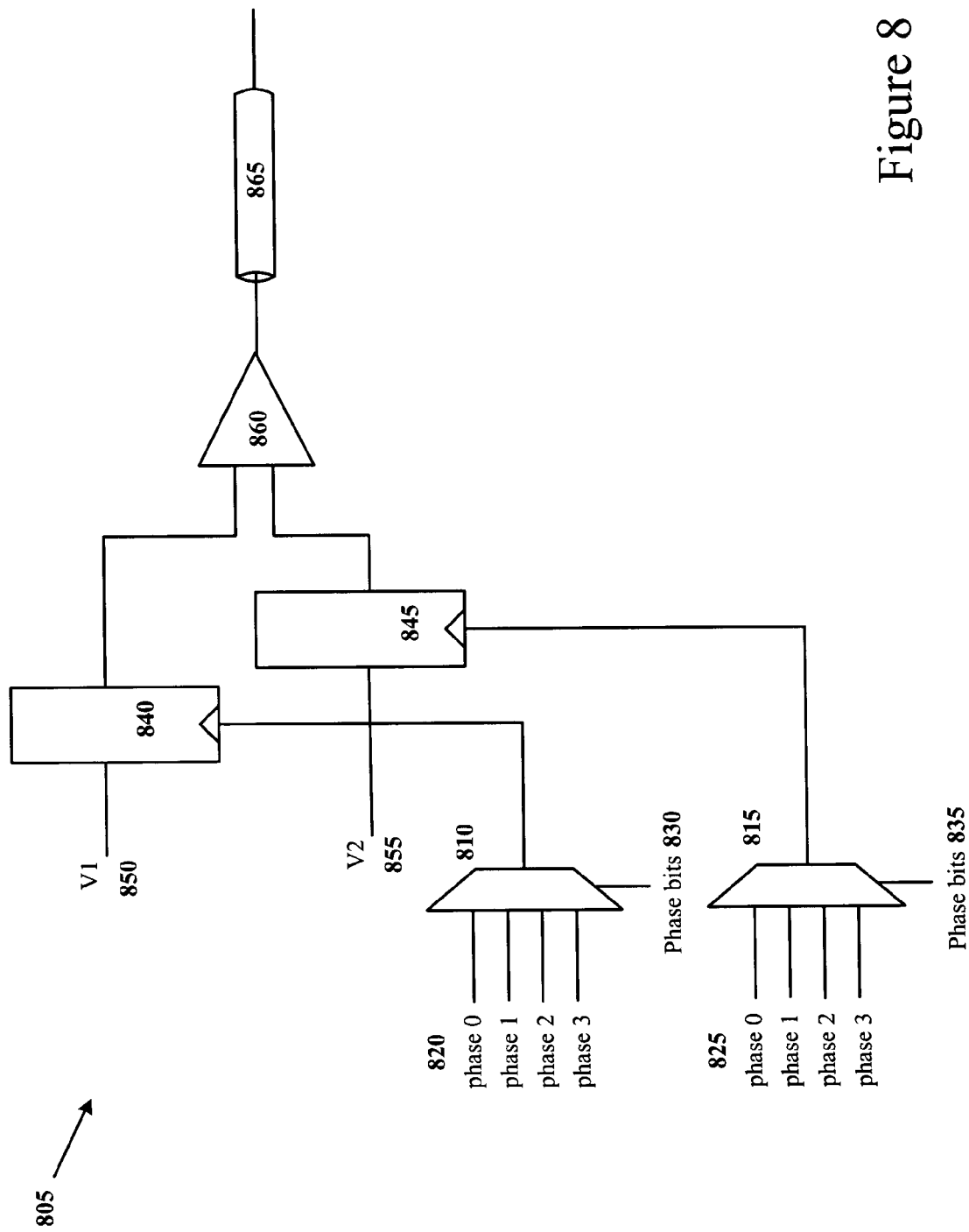
FIG. 8 is a diagram illustrating an embodiment of signal generation for a modulation scheme that includes staircase modulation.

FIG. 8 illustrates an embodiment of signal modulation operation that includes staircase modulation. In this example, a first multiplexer 810 chooses a phase position for a transition to a first amplitude and a second multiplexer 815 chooses a phase position for a transition to a second amplitude. The first multiplexer 810 receives a first phase selection signal to choose from the phase inputs 820. The second multiplexer 815 receives a second phase selection signal to choose from the phase inputs 820. In the case of a single transition in a symbol, only one of the multiplexers will be activated. In the case of a staircase modulation, both multiplexers will be activated. The first multiplexer 810 provides a clock input to a first logic device 840, which receives a first amplitude signal V1 850. The second multiplexer 810 provides a clock input to a second logic device 840, which receives a second amplitude signal V2 855. The outputs of the first logic device 840 and the second logic device 840 are provided to a signal generator 860, which generates a modulated signal to be transferred over a communication channel 865. Because of the multiple phase selections, the system illustrated in FIG. 8 can produce staircase modulation.

Figure 9:
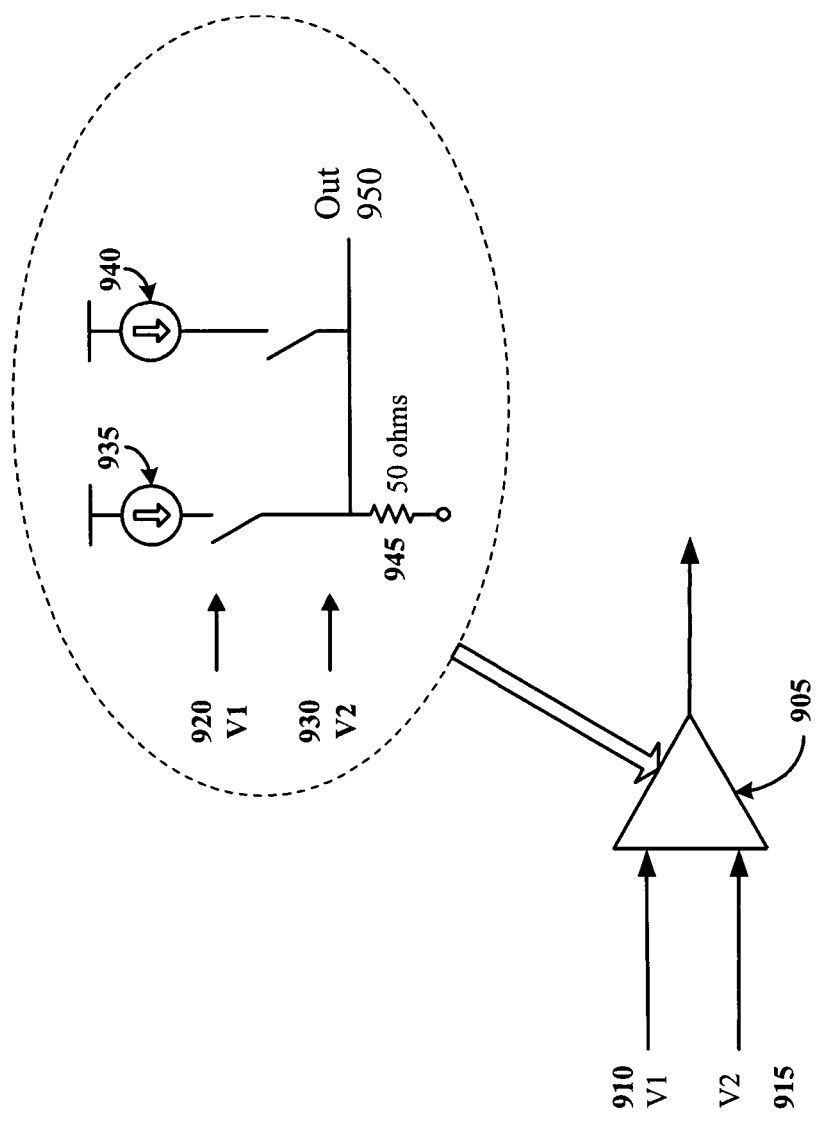
FIG. 9 is a diagram illustrating an embodiment of a device for producing modulated signals.

FIG. 9 illustrates an embodiment of a unit to generate a modulated signal. The illustration provided is a functional block diagram to illustrate the signal modulation operation, but a modulated signal may be generated by any known method, circuit, or device. In this illustration, a generator unit 905 receives two inputs, a signal for a first amplitude V1 910 and a signal for a second amplitude V2 915. Functionally, the signals, how shown as V1 920 and V2 930, control two switches. An active V1 920 activates a first switch 950, which provides a path from current from a first current source 935 through a load 945, shown as a 50-ohm resistor. The first current times the load resistance then provides a voltage drop equal to the first signal amplitude. An active V2 920 activates a second switch 955, which provides a path from current from a second current source 935 through the load 945, with the second current times the load resistance equaling the second signal amplitude. In an alternative embodiment, a first signal turns on a first switch and a second signal turns on both switches, with the same signal modulation being provided. The modulated signal is then provided to the output 950.

Figure 10:
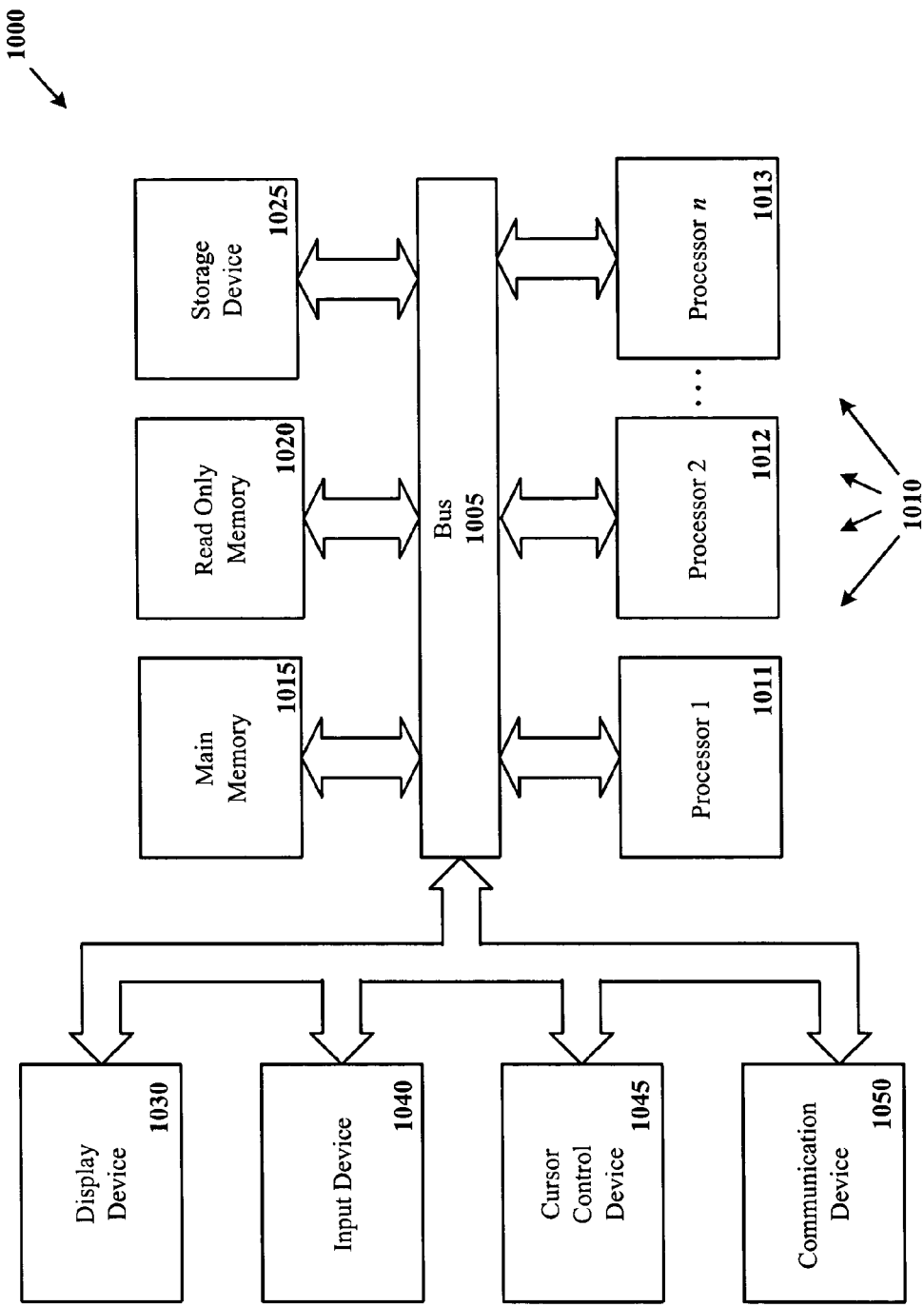
FIG. 10 is an illustration of an embodiment of a computer environment.

Techniques described here may be used in many different environments. FIG. 10 is block diagram of an exemplary computer that may be used in conjunction with an embodiment of the invention. Under an embodiment of the invention, the computer may comprise an embedded system or other special purpose computer. An embedded system or other special purpose computer may operate without certain of the components and features described herein. An embodiment of the invention may be utilized for the transfer of signals between components or devices in the exemplary computer.

Under an embodiment of the invention, a computer 1000 comprises a bus 1005 or other communication means for communicating information, and a processing means such as one or more processors 1010 (shown as 1011, 1012 and continuing through 1013) coupled with the first bus 1005 for processing information.

The computer 1000 further comprises a random access memory (RAM) or other dynamic storage device as a main memory 1015 for storing information and instructions to be executed by the processors 1010. Main memory 1015 also may be used for storing temporary variables or other intermediate information during execution of instructions by the processors 1010. The computer 1000 also may comprise a read only memory (ROM) 1020 and/or other static storage device for storing static information and instructions for the processor 1010.

A data storage device 1025 may also be coupled to the bus 1005 of the computer 1000 for storing information and instructions. The data storage device 1025 may include a magnetic disk or optical disc and its corresponding drive, flash memory or other nonvolatile memory, or other memory device. Such elements may be combined together or may be separate components, and utilize parts of other elements of the computer 1000.

The computer 1000 may also be coupled via the bus 1005 to a display device 1030, such as a liquid crystal display (LCD) or other display technology, for displaying information to an end user. In some environments, the display device may be a touch-screen that is also utilized as at least a part of an input device. In some environments, display device 1030 may be or may include an auditory device, such as a speaker for providing auditory information. An input device 1040 may be coupled to the bus 1005 for communicating information and/or command selections to the processor 1010. In various implementations, input device 1040 may be a keyboard, a keypad, a touch-screen and stylus, a voice-activated system, or other input device, or combinations of such devices. Another type of user input device that may be included is a cursor control device 1045, such as a mouse, a trackball, or cursor direction keys for communicating direction information and command selections to processor 1010 and for controlling cursor movement on display device 1030.

A communication device 1050 may also be coupled to the bus 1005. Depending upon the particular implementation, the communication device 1050 may include a transceiver, a wireless modem, a network interface card, or other interface device. The computer 1000 may be linked to a network or to other devices using the communication device 1050, which may include links to the Internet, a local area network, or another environment.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method comprising:
   producing a modulated signal, the modulated signal being amplitude modulated over a plurality of amplitude levels, including at least a first amplitude level, a second amplitude level and a third amplitude level, wherein the second amplitude is between the first amplitude level and third amplitude level, and phase modulated over a plurality of time slots, including at least a first time slot, a second time slot that is after the first time slot, and a third time slot that is after the second time slot, the modulated signal:
   transitioning from the first amplitude level to the second amplitude level in the first time slot,
   remaining at the second amplitude level in the second time slot,
   transitioning from the second amplitude level to the third amplitude level in the third time slot, and
   returning to the first amplitude level; and
   transferring the modulated signal.

2. The method of claim 1, wherein the modulated signal is orthogonal, the signal being modulated in amplitude and phase wherein the amplitude modulation and phase modulation being mutually independent.

3. The method of claim 1, wherein producing the modulated signal further comprises remaining at the second amplitude level for a plurality of time slots.

4. The method of claim 1, wherein the modulated signal returning to the first amplitude level comprises the modulated signal being modulated over a plurality of additional time slots, including at least a fourth time slot that is after the third time slot, a fifth time slot that is after the fourth time slot, and a sixth time slot that is after the fifth time slot, the modulated signal:
   transitioning from the third amplitude level to the second amplitude level in the fourth time slot,
   remaining at the second amplitude level in the fifth time slot, and
   transitioning from the second amplitude level to the first amplitude level in the sixth time slot.

5. The method of claim 1, wherein transferring the modulated signal comprises transmitting the modulated signal over a communication channel.

6. The method of claim 1, wherein transferring the modulated signal comprises transferring the modulated signal over a bus.

7. A method comprising:
   generating a modulated signal using a first modulation mode, wherein the first modulation mode is amplitude modulation over a plurality of amplitude levels, and a second modulation mode, wherein the second modulation mode is phase modulation over a plurality of time slots, the first modulation mode having a plurality of different positions including at least a first position, a second position, and a third position, the second position of the first modulation mode being between the first position and the third position of the first modulation mode, the second modulation mode having a plurality of different positions, including at least a first position, a second position, and a third position, the second position of the second modulation mode being between the first position and the third position of the second modulation mode;
   the modulated signal transitioning from the first position to the second position of the first modulation mode while in the first position of the second modulation mode;
   the modulated signal remaining in the second position of the first modulation mode while in the second position of the second modulation mode;
   the modulated signal transitioning from the second position to the third position of the first modulation mode while in the third position of the second modulation mode;
   the modulated signal returning to first position of the first modulation mode; and
   transferring the modulated signal over a communication channel.

8. The method of claim 7, wherein the first modulation mode comprises signal amplitude.

9. The method of claim 8, wherein the second modulation mode comprises signal phase.

10. The method of claim 7, wherein the modulated signal is orthogonal.

11. The method of claim 7, wherein, in returning to the first position of the first modulation mode, the modulated signal further:
    transitions from the third position to the second position of the first modulation mode while in a fourth position of the second modulation mode;
    remains in the second position of the first modulation mode while in a fifth position of the second modulation mode; and
    transitions from the second position to the first position of the first modulation mode while in a sixth position of the second modulation mode;
    wherein the fourth position of the second modulation mode is between the third position and the fifth position of the second modulation mode, and wherein the fifth position of the second modulation mode is between the fourth position and the sixth position of the second modulation mode.

12. A method comprising:
    producing a modulated signal, the modulated signal being amplitude modulated over a plurality of amplitude levels, including at least a first amplitude level, a second amplitude level, and a third amplitude level, wherein the second amplitude is between the first amplitude level and third amplitude level, and phase modulated over a plurality of phase slots, including at least a first phase slot, a second phase slot that is after the first phase slot, and a third phase slot that is after the second phase slot, the modulated signal:
    transitioning from the first amplitude level to the second amplitude level in the first phase slot,
    remaining at the second amplitude level in the second phase slot,
    transitioning from the second amplitude level to the third amplitude level in the third phase slot, and
    returning to the first amplitude level;
    transferring the modulated signal;
    receiving the modulated signal; and
    demodulating the modulated signal.

13. The method of claim 12, wherein the modulated signal is orthogonal, the signal being modulated in amplitude and phase wherein the amplitude modulation and phase modulation being mutually independent.

14. The method of claim 12, wherein the modulated signal remains at the second amplitude level for a plurality of phase slots.

15. The method of claim 12, wherein the modulated signal returning to the first amplitude level includes the modulated signal transitioning from the third amplitude level to the first amplitude level in a fourth phase slot, the fourth phase slot being after the third phase slot.

16. The method of claim 12, wherein the modulated signal returning to the first amplitude level includes the modulated signal transitioning from the third amplitude level to the second amplitude level in a fourth phase slot, the fourth phase slot being after the third phase slot, remains at the second amplitude level in a fifth phase slot, the fifth phase slot being after the fourth phase slot and transitions from the second amplitude level to the first amplitude level in a sixth phase slot, the sixth phase slot being after the fifth phase slot.

17. A method comprising:
obtaining a data signal;
modulating the data signal to form a modulated signal, the modulated signal being one of a plurality of modulated signals, each of the plurality of modulated signals being amplitude modulated over a plurality of amplitude levels, including at least a first amplitude level, a second amplitude level, and a third amplitude level, wherein the second amplitude is between the first amplitude level and third amplitude level, and phase modulated over phase slots, the plurality of modulated signals comprising:
a signal that:
transitions from the first amplitude level to the second amplitude level in one of a first plurality of phase slots; and
transitions from the second amplitude level to the first amplitude level in one of a second plurality of phase slots; and
a signal that:
transitions from the first amplitude level to a third amplitude level in one of the first plurality of phase slots; or transitions from the first amplitude level to the second amplitude level in a first slot of the first plurality of phase slots, remains at the second amplitude level for a second slot of the first plurality of phase slots, and transitions from the second amplitude level to the third amplitude level in a third slot of the first plurality of phase slots, wherein the second phase slot is after the first phase slot and the third phase slot is after the second phase slot; and
transitions from the third amplitude level to the first amplitude level in one of the second plurality of phase slots; or transitions from the third amplitude level to the second amplitude level in a first slot of the second plurality of phase slots, remains at the second amplitude level for a second slot of the second plurality of phase slots, and transitions from the second amplitude level to the first amplitude level in a third slot of the second plurality of phase slots, wherein the second phase slot is after the first phase slot and the third phase slot is after the second phase slot; and
transferring the plurality of modulated signals from a first unit to a second unit over a communication channel.

18. The method of claim 17, wherein the modulated signal is orthogonal.

19. A device comprising:
an output to a communication channel; and
a signal generator to produce a modulated signal on the communication channel, the modulated signal comprising:
a first modulation mode, wherein the first modulation mode is amplitude modulation, the modulated signal having a plurality of possible positions in the first modulation mode, and
a second modulation mode, wherein the second modulation mode is phase modulation, the modulated signal having a plurality of possible positions in the second modulation mode;
the modulated signal transitioning from a first position to a second position in the first modulation mode while in a first position of the second modulation mode;
the modulated signal remaining in the second position in the first modulation mode while in a second position of the second modulation mode; and
the modulated signal transitioning from the second position to a third position in the first modulation mode while in a third position of the second modulation mode; and returning to the first position in the first modulation mode;
wherein the second position of the first modulation mode is between the first position and the third position of the first modulation mode, and wherein the second position of the second modulation mode is between the first position and the third position of the second modulation mode.

20. The device of claim 19, wherein the first modulation mode comprises signal amplitude.

21. The device of claim 20, wherein the second modulation mode comprises signal phase.

22. The device of claim 19, wherein the modulated signal is orthogonal.

23. A system comprising:
a communication channel;
a first device to transfer a modulated signal over the communication channel, the modulated signal, being amplitude and phase modulated:
transitioning from a first amplitude level to a second amplitude level in a first time slot,
remaining at the second amplitude level in a second time slot, the second time slot being after the first time slot, and
transitioning from the second amplitude level to a third amplitude level in a third time slot, the second amplitude level being between the first amplitude level and the third amplitude level, and the third time slot being after the second time slot; returning to the first amplitude level; and
a second device to receive the modulated signal over the communication channel.

24. The system of claim 23, wherein the modulated signal is orthogonal, the signal being modulated in amplitude and phase wherein the amplitude modulation and phase modulation being mutually independent.

25. The system of claim 23, wherein the modulated signal remains at the first amplitude level for a plurality of time slots before transitioning to the second amplitude level.

* * * * *